March 10, 1964  G. G. WEISSENSEE ETAL  3,123,955
PACKAGING ARTICLES IN HEAT SHRINKABLE AND SEALABLE FILM
Filed Jan. 26, 1961  2 Sheets-Sheet 1
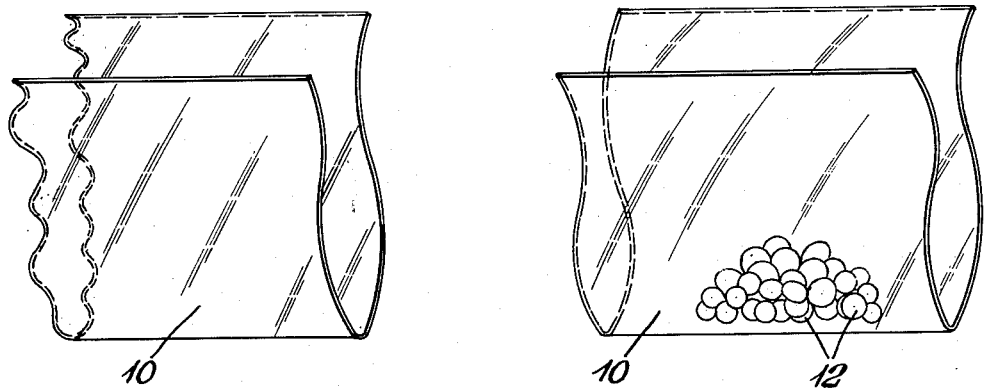
Step A  *Fig. 1.*  Step B
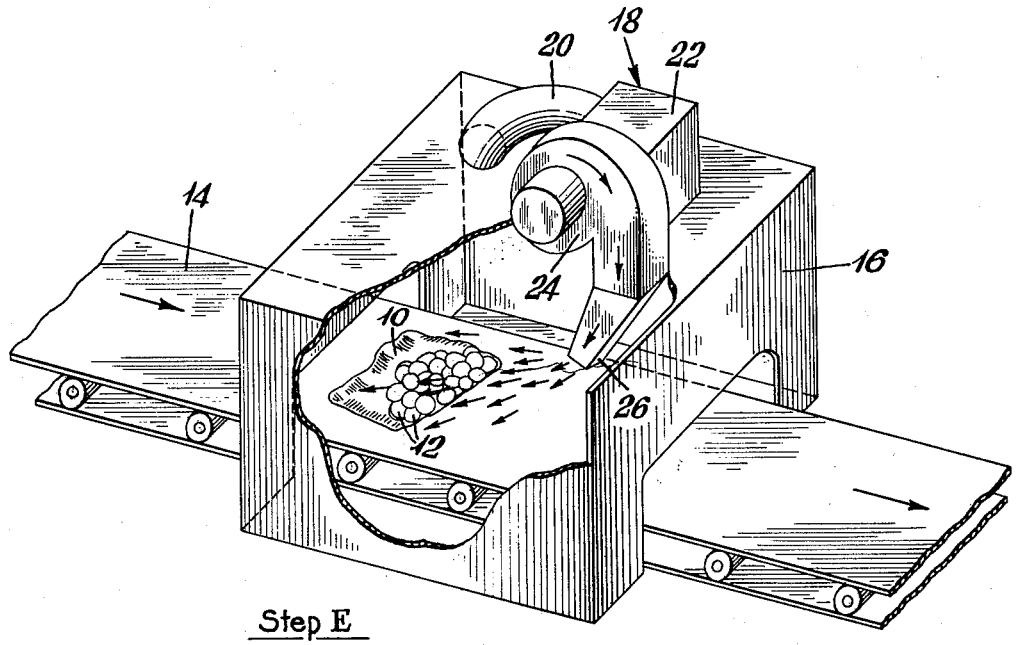
Step E
*Fig. 3.*
INVENTORS
GUNTHER G. WEISSENSEE
CLYDE N. KRACHT
BY
ATTORNEY

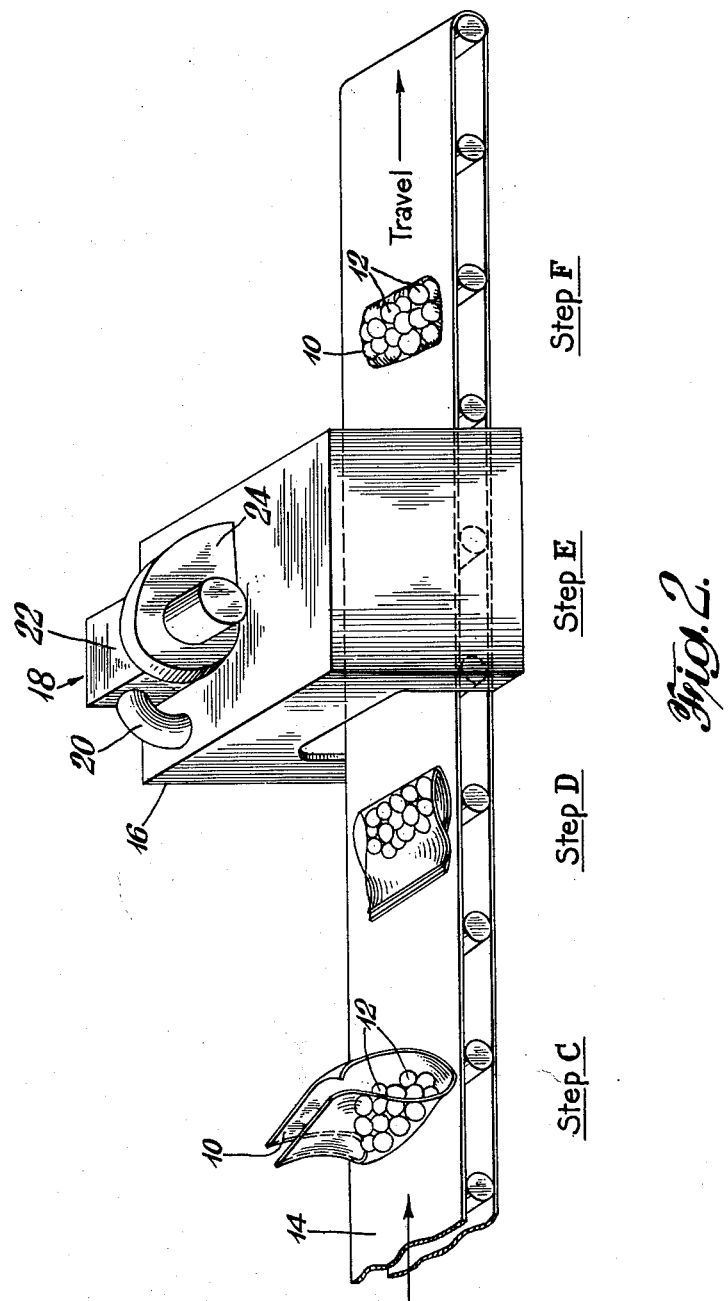

United States Patent Office 3,123,955
Patented Mar. 10, 1964

3,123,955
PACKAGING ARTICLES IN HEAT SHRINKABLE AND SEALABLE FILM
Gunther G. Weissensee, Park Forest, and Clyde N. Kracht, La Grange Park, Ill., assignors to Union Carbide Corporation, a corporation of New York
Filed Jan. 26, 1961, Ser. No. 85,079
4 Claims. (Cl. 53—30)

This invention relates to packaging an article or articles in a heat shrinkable and heat sealable film. More particularly, this invention relates to enveloping and heat sealing articles to be packaged into a thermoplastic film structure by only the employment of a velocitous stream of heated gas.

Various methods have heretofore been used for packaging an article or articles in thermoplastic film, some of which require prefabricated envelopes, bags or sleeves, and a filling operation which is usually followed by subsequent closing and/or heat sealing operations wherein conventional heat sealing equipment, such as a bar sealer for applying heat and mechanical pressure, are used. Other methods which have heretofore been used gather the excess packaging film into a pocket or pouch about the article or articles to be packaged and tie, clip, staple, or seal the gathered portion to form a crude pouch container for the article or articles.

It is an object of this invention to provide a simple and inexpensive method for enveloping and sealing an article or articles into a thermoplastic film wrap.

Another object of this invention is to eliminate the need for initially prefabricating an envelope, pouch or sleeve, and inserting and sealing an article or articles therein.

Still another object of this invention is to seal a film enveloped article without the use of mechanical pressure, such as used by the bar sealer and the like.

Other and additional objects will become apparent hereinafter.

In accordance with the present invention an article or a plurality of articles are wrapped in heat shrinkable and heat sealable film by the steps which comprise placing the article or articles in the centerfold formed between the plies of a sheet of said film folded to circumscribe the article or articles such that the edges or free margins of the film plies are in superimposed relationship, feeding the thus film circumscribed article or articles through a heating zone with the film centerfold as the leading edge and wherein a velocitous stream of heated gas is directed onto the advancing article or articles circumscribing film in a manner such as to initially impinge upon the centerfold of such film and to mate the free margins of the film plies and concurrently seal such mated mutual contacting film margins to each other and progressively shrink the circumscribing film about the article or articles to yield a tightly film enveloped sealed article or articles and thereafter feeding the sealed unit package to a collection station ready for shipment and/or use.

It is preferred to use thin thermoplastic film, such as polyethylene film having a thickness of 0.0008 inch, as the wrapping material because it readily drapes over the article or articles and its margins lie in flat mutual contact and are maintained in contact while shrinking, from heat applied thereto by impingement of the heated gas stream, to facilitate the subsequent welding of the edges of the two plies into a sealed package without having mechanical pressure applied thereto.

The nature of the invention and the manner in which this invention can be practiced will become clear from the detailed description when taken in conjunction with the accompanying drawings forming a part of this specification and wherein like reference numerals designate like parts, except as otherwise indicated.

FIGURE 1 illustrates a sequence of steps for placing articles in a web of folded, thin thermoplastic film and cutting a length of said film from the parent web;

FIGURE 2 is a schematic embodiment of apparatus for packaging the film enveloped articles, and illustrates a sequence of steps for feeding the film enveloped articles through a heat tunnel and the resultant packaged product; and FIGURE 3 is a perspective, partly in section, of the heat tunnel wherein film enveloped articles are subjected to a velocitous stream of hot air.

Referring to FIGURE 1 wherein is shown the steps of horizontally moving a web of a folded thin heat shrinkable and sealable thermoplastic film 10 as illustrated at step A in an open V-shape underneath a hopper or article dispensing station, not shown. As an example of an article, poultry giblets 12 from the dispensing station are placed in the trough or centerfold at the leading end portion of the thermoplastic film 10. At step B the length of thermoplastic film containing the giblets 12 is then severed from the parent web with sufficient margin of the film plies extending on the side of giblets 12 for subsequent draping and welding the film about the giblets 12.

Refer now to FIGURE 2 wherein the film enveloped articles are shown at several stages of the sealing operation. As shown in step C of the process, the film enveloped giblets 12 are placed onto a conveyor 14 travelling at a right angle to the travel of the parent web, thus bringing the fold of the film length into the advanced or leading position as it lays on the moving conveyor 14.

At step D the giblets 12 are draped within the length of the folded film, with the film centerfold positioned as the leading edge and with the top and bottom plies of the film in superimposed relationship. Step D also illustrates that the conveyor 14 is moving the thus film enveloped giblets 12 toward a heating zone or tunnel 16 provided with means 18 on the top thereof for directing a velocitous stream of heated gas onto the film. In the illustrated embodiment the means 18 includes an air intake duct 20 connected to the interior of the tunnel 16 and an electric heater 22 for heating air delivered thereto by the duct 20 to a temperature of about 275° F. to 375° F. The heater 22 in turn is connected to the inlet of a blower 24 for imparting velocity to the heater delivered air, such as from about 750 to 2000 feet per minute. Depending from the outlet of the blower 24 and into the interior of the heat tunnel 16 as shown in FIGURE 3 is a directional air nozzle 26 arranged to direct the velocitous stream of heated air from the blower 24 obliquely downward toward the entrance end of the heat tunnel 16 initially impinging against the centerfold of the thin film overwrap and thence flowing thereonto such that the film plies drape about the surfaces of the enveloped giblets 12 with their free margins or edges being subjected to a wiping action by the velocitous stream of heated air as the film circumscribed giblets 12 are advanced through the heat tunnel 16. FIGURE 3 also illustrates Step E of the sealing or welding operation wherein the film margins have been mated by the impinging velocitous stream of heated air which also concurrently seals or welds such mated mutual contacting film margins to each other and progressively shrinks the circumscribing film about the giblets 12.

In the last step, herein designated as step F, of the method the resultant tightly film enveloped and sealed giblets 12 are shown. The packaged articles are now ready for shipping and/or for use.

It is preferred that the folded end of the film overwrap be the first entering the heat tunnel 16 for it thereby serves as a base line about which the side margins of the film plies initially shrink and also serves to position the giblets 12 in the shrinking film plies. As the film enveloped articles pass progressively into the heat zone tunnel, the shrinking of the film likewise progresses about the enveloped giblets 12, and serves to position the top and bottom plies of the film margin for subsequent welding into a unit. The velocitous air from the blower also assists in wrapping the giblets 12 in that it keeps the top ply in position and contact therewith.

This invention is admirably suited for packaging resilient and solid objects, and uniform and irregularly shaped objects. It is also useful for bunching, gathering and collecting a plurality of articles of similar or dissimilar shapes. Of course, this invention is equally suited for packaging single items. The type, thickness, draping equality and heat-seal range of thermoplastic film employed in practicing the method, and nature of the object to be packaged, determines the conveyor speed and optimum temperature of the heat tunnel for effective sealing without applied mechanical pressure of conventional heat sealing equipment.

The details and manner of practicing this invention will become apparent by reference to the following specific examples, it being understood that these examples are merely illustrative embodiments of the invention and that the scope of the invention is not limited thereto.

*Example I*

Sample sealed film packages were prepared by the shrink-seal method of this invention, enveloping many varieties and shapes of articles such as: poultry giblets, plastic picnic forks, small hardware parts, erasers, etc. Polyethylene film of low density (up to 0.94 density) was used, such as Visking Company's Visqueen film, treated and untreated, in various thicknesses from .0005 inch to .001 inch and the film was shrink-sealed about the articles in a heat tunnel by a 2 to 5 second exposure to a stream of hot air at a temperature ranging from about 275° to 325° F. and at a velocity of about 750 to 2000 feet per minute.

*Example II*

Sample sealed film packages were prepared by the present shrink-seal method enveloping articles similar to Example I, using polypropylene film, in various thicknesses from .00025 inch to .00075 inch. This film was shrink-sealed about the articles in a treatment chamber by 3 to 6 second exposure to a stream of hot air at a temperature ranging from 365° F. to 413° F. and a velocity from about 750 to 2000 feet per minute.

It is to be noted, the principles of this invention are not restricted to the use of polyethylene or polypropylene film. They are also applicable to other thermoplastic film such as Pliofilm, Saran, polymer modified vinyl copolymer, polymer or liquid plasticized polyvinyl chloride, polyethylene terephthalate ("nylon"), etc. which are shrinkable and sealable. In general, the thickness of these films may be within the range of .00025 inch to .0010 inch or more.

It will be obvious to those skilled in the art that various changes and modification can be made in the above description without departing from the nature and spirit of the invention.

What is claimed is:

1. A method of packaging articles within a sheet of a heat shrinkable and sealable film comprising folding the sheet of film into an open V-shape, placing the articles at the fold and between the plies of said film such that the film circumscribes the articles, feeding the thus film circumscribed articles through a heating zone with the centerfold of the film foremost, and directing a high velocity stream of heated gas obliquely downward onto said film within said zone while advancing said film-circumscribed articles so that said gas stream initially impinges against the centerfold of the film plies and thence flows onto the film subjecting the free margins of the film plies about the articles to a wiping action to mate them in mutual contact and concurrently seal said mated mutually contacting free margins to each other and progressively shrink the film plies about the articles to yield tightly film enveloped and sealed articles.

2. The method according to claim 1 wherein the velocitous stream of heated gas is air at a velocity of about 750 to 2000 feet per minute and heated to a temperature of about 275° F. to 375° F.

3. The method according to claim 1 wherein the sheet of film essentially consists of a member selected from the group of polyethylene and polypropylene.

4. The method according to claim 1 wherein the articles are dissimilar.

References Cited in the file of this patent

UNITED STATES PATENTS

| | | |
|---|---|---|
| 2,168,651 | McCoy | Aug. 8, 1939 |
| 2,340,260 | Clunan | Jan. 25, 1944 |
| 2,362,459 | Barnett | Nov. 14, 1944 |
| 2,423,237 | Haslacher | July 1, 1947 |
| 2,486,759 | Pfeiffer | Nov. 1, 1949 |
| 2,879,635 | Brock | Mar. 31, 1959 |
| 2,904,943 | Dreyfus et al. | Sept. 22, 1959 |
| 2,928,220 | Kannengiesser et al. | Mar. 15, 1960 |
| 3,034,271 | Carpenter et al. | May 15, 1962 |

FOREIGN PATENTS

| | | |
|---|---|---|
| 683,257 | Great Britain | Nov. 26, 1952 |